(12) United States Patent
Banik et al.

(10) Patent No.: US 11,144,582 B2
(45) Date of Patent: Oct. 12, 2021

(54) METHOD AND SYSTEM FOR PARSING AND AGGREGATING UNSTRUCTURED DATA OBJECTS

(71) Applicant: Accenture Global Services Limited, Dublin (IE)

(72) Inventors: Avikar Banik, Kolkata (IN); Koustuv Jana, Bangalore (IN); Jenice J. Mukkada, Bangalore (IN); Reshma Abhijit Gurjar, Maharashtra (IN); Priya Athreyee, Tamil Nadu (IN); Rajendra Prasad, Bangalore (IN); Divya Sampathkumar, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 531 days.

(21) Appl. No.: 15/194,109

(22) Filed: Jun. 27, 2016

(65) Prior Publication Data

US 2016/0378859 A1    Dec. 29, 2016

(30) Foreign Application Priority Data

Jun. 29, 2015  (IN) .......................... 3261/CHE/2015

(51) Int. Cl.
*G06F 16/35*  (2019.01)
*G06Q 10/10*  (2012.01)

(52) U.S. Cl.
CPC ......... *G06F 16/358* (2019.01); *G06Q 10/103* (2013.01)

(58) Field of Classification Search
USPC ........................................................ 707/708
See application file for complete search history.

(56) References Cited

U.S. PATENT DOCUMENTS

| | | | | |
|---|---|---|---|---|
| 6,799,154 B1* | 9/2004 | Aragones | .............. | G06F 11/008 702/34 |
| 6,829,734 B1* | 12/2004 | Kreulen | ................. | G06Q 30/02 379/9.02 |
| 8,972,379 B1* | 3/2015 | Grieselhuber | ...... | G06F 17/3089 707/713 |
| 2003/0041059 A1* | 2/2003 | Lepien | .............. | G06F 17/30985 |
| 2007/0088686 A1* | 4/2007 | Hurst-Hiller | ..... | G06F 17/30395 |

(Continued)

OTHER PUBLICATIONS

Office Action in India Application No. 3261/CHE/2015, dated Nov. 19, 2019, 7 pages.

*Primary Examiner* — Allen S Lin
(74) *Attorney, Agent, or Firm* — Brinks Gilson & Lione

(57) ABSTRACT

A computer-implemented method and a system parse and aggregate unstructured data objects. The method includes obtaining the unstructured data objects from description fields of records in a database comprising client tickets that are created for application maintenance, transforming the obtained unstructured data objects to create transformed data objects, identifying a number of criteria attributes of the client tickets, where the number of criteria attributes are determined according to at least part of the transformed data objects, word importance, word sentiment, a user input, or client ticket priorities, or any combinations, and generating a plurality of ticket reports by aggregating the client tickets according to ranking orders of numbers of tickets for the client tickets and the identified criteria attributes.

24 Claims, 14 Drawing Sheets

(56) References Cited

U.S. PATENT DOCUMENTS

| | | | | |
|---|---|---|---|---|
| 2011/0093397 A1* | 4/2011 | Carlson | ................. | G06Q 10/10 |
| | | | | 705/67 |
| 2013/0031088 A1* | 1/2013 | Srikrishna | ......... | G06F 17/30864 |
| | | | | 707/722 |
| 2013/0173306 A1* | 7/2013 | Sasidhar | ........... | G06F 17/30864 |
| | | | | 705/3 |
| 2014/0114970 A1* | 4/2014 | Prabu | ................ | G06F 17/30554 |
| | | | | 707/736 |
| 2014/0156588 A1* | 6/2014 | Mohanty | ........... | G06F 17/30289 |
| | | | | 707/600 |
| 2015/0019537 A1* | 1/2015 | Neels | ................ | G06F 17/30551 |
| | | | | 707/722 |
| 2015/0161633 A1* | 6/2015 | Adams | ............... | G06Q 30/0204 |
| | | | | 705/7.33 |
| 2015/0317303 A1* | 11/2015 | Zhang | .................... | H04L 51/32 |
| | | | | 707/776 |
| 2016/0063590 A1* | 3/2016 | Subramanya | ...... | G06Q 30/0623 |
| | | | | 705/26.61 |
| 2016/0170993 A1* | 6/2016 | Katz | ..................... | G06Q 10/00 |
| | | | | 707/727 |

* cited by examiner

| Ticket ID | TICKET DESCRIPTION | Ticket Priority | Ticket Open Date(mm/dd/yyyy) |
|---|---|---|---|
| IN1163431 | 19 - EU - SD - : PZSD_MAIN_META1 | P2 | 1/1/2013 1:01 |
| IN1980614 | Message|Physical Memory Usage High Physical Memory | P3 | 5/1/2012 0:49 |
| IN1980872 | 04 - EU - SC - PBIAPODLYCHNS.PZSC_MM_LOAD_TD_DAILY-MC | P3 | 5/1/2012 3:31 |
| IN1980874 | 04 - EU - MD Job PBIDLYCHAINS.PZMD_CHAIN failed, no | P3 | 5/1/2012 3:32 |
| IN1980875 | us6ptwd01 Job PR13DOTCPALLETTK.PR11DPAL failed, no | P3 | 5/1/2012 3:33 |
| IN1981088 | PR1 - VL22 fills up system messages with warnings | P3 | 5/1/2012 5:44 |
| IN1981178 | Missing Images for 7 Barcodes. | P3 | 5/1/2012 6:38 |
| IN1981191 | Reset password on SPTestUser account | P3 | 5/1/2012 6:54 |
| IN1981201 | SAP SRM Account Locked out unable to access | P3 | 5/1/2012 6:59 |
| IN1981227 | MSA ACCESS REQUEST | P3 | 5/1/2012 7:18 |
| IN1981274 | RESEND INVOICES SU THROUGH SAP-EDI - URGENT - TOTAL | P3 | 5/1/2012 7:51 |
| IN1981275 | User not able to edit in sap pr1 travel expenses | P3 | 5/1/2012 7:53 |
| IN1981289 | Aim application failure | P3 | 5/1/2012 8:08 |
| IN1981348 | Resolvd - user called to report missing calls in msa | P3 | 5/1/2012 8:16 |
| IN1981370 | Ingrid B79359, Wrong data for some customers in the calling | P3 | 5/1/2012 8:32 |
| IN1981375 | N88293, SQ01 - SAP Query: Maintain queries URGENT | P3 | 5/1/2012 8:34 |
| IN1981417 | 04 - CRM WDI - GB - Codes to be Deleted from the DSO | P3 | 5/1/2012 8:54 |
| IN1981468 | SAP IMS (PE1) / ACCESS ISSUES / PASSWORD RESET | P3 | 5/1/2012 9:14 |
| IN1981472 | CG INDIA-New mailbox creation in Outlook Mail box-Tkt # | P3 | 5/1/2012 9:15 |
| IN1981556 | Please grant B22151 & B22156 access to BP Open Filenet. | P3 | 5/1/2012 9:36 |
| IN1981664 | User B20927 - Business Objects issue--160760 | P3 | 5/1/2012 10:34 |
| IN1981688 | Missing Document RSA to IMS dated 01052012 CG tkt # | P3 | 5/1/2012 10:43 |
| IN1981813 | EIC employee interraction center is very slow | P3 | 5/1/2012 11:31 |

FIG. 3

| Ticket ID | TICKET DESCRIPTION | Ticket Priority | Ticket Open Date(mm/dd/yyyy) |
|---|---|---|---|
| IN11663431 | 19 EU SD PZSD_MAIN_META1 | P2 | 1/1/2013 1:01 |
| IN11980614 | MESSAGE PHYSICAL MEMORY USAGE HIGH PHYSICAL | P3 | 5/1/2012 0:49 |
| IN11980872 | 04 EU SC PBIAPODLYCHNS PZSC_MM_LOAD_TD_DAILY_MC FA | P3 | 5/1/2012 3:31 |
| IN11980874 | 04 EU MD JOB PBIDLYCHAINS PZMD_CHAIN FAILED | P3 | 5/1/2012 3:32 |
| IN11980875 | US6PTWD01 JOB PR13DOTCPALLETTK PR11DPAL FAILED | P3 | 5/1/2012 3:33 |
| IN11981088 | PR1 VL22 FILLS SYSTEM MESSAGES WARNINGS | P3 | 5/1/2012 5:44 |
| IN11981178 | MISSING IMAGES 7 BARCODES. | P3 | 5/1/2012 6:38 |
| IN11981191 | RESET PASSWORK SPTESTUSER ACCOUNT | P3 | 5/1/2012 6:54 |
| IN11981201 | SAP SRM ACCOUNT LOCKED UNABLE ACCESS | P3 | 5/1/2012 6:59 |
| IN11981227 | MSA ACCESS REQUEST | P3 | 5/1/2012 7:18 |
| IN11981274 | RESEND INVOICES SU SAP EDI URGENT TOTAL AMOUNT 1 803 | P3 | 5/1/2012 7:51 |
| IN11981275 | USER ABLE EDIT SAP PR1 TRAVEL EXPENSES MANAGEMENT | P3 | 5/1/2012 7:53 |
| IN11981289 | AIM APPLICATION FAILURE | P3 | 5/1/2012 8:08 |
| IN11981348 | RESOLVD USER CALLED REPORT MISSING CALLS MSA | P3 | 5/1/2012 8:16 |
| IN11981370 | INGRID B79359 WRONG DATA CUSTOMERS CALLING DELAY | P3 | 5/1/2012 8:32 |
| IN11981375 | N88293 SQ01 SAP QUERY MAINTAIN QUERIES URGENT | P3 | 5/1/2012 8:34 |
| IN11981417 | 04 CRM WDI GB CODES DELETED DSO | P3 | 5/1/2012 8:54 |
| IN11981468 | SAP IMS PE1 ACCESS ISSUES PASSWORD RESET | P3 | 5/1/2012 9:14 |
| IN11981472 | CG INDIA NEW MAILBOX CREATION OUTLOOK MAIL BOX TKT | P3 | 5/1/2012 9:15 |
| IN11981556 | PLEASE GRANT B22151 B22156 ACCESS BP OPEN FILENET | P3 | 5/1/2012 9:36 |
| IN11981664 | USER B20927 BUSINESS OBJECTS ISSUE160760 | P3 | 5/1/2012 10:34 |
| IN11981688 | MISSING DOCUMENT RSA IMS DATED 01052012 CG TKT | P3 | 5/1/2012 10:43 |
| IN11981813 | EIC EMPLOYEE INTERRACTION CENTER SLOW | P3 | 5/1/2012 11:31 |

FIG. 4

METHOD AND SYSTEM FOR PARSING AND AGGREGATING UNSTRUCTURED DATA OBJECTS

FIELD OF THE TECHNOLOGY

The disclosure relates to the field of data processing, and more particularly, it relates to a method and a system for parsing and aggregating unstructured data objects.

BACKGROUND OF THE TECHNOLOGY

A computer system may be used for managing and maintaining lists of issues for tracking computer application defects and glitches. The lists of issues may also be client tickets that have unstructured data objects that may be used to describe issues encountered such as system defects and glitches. Conventionally, client tickets may be created when issues arise during the running of computer application systems. As such, there are technical problems to be resolved when unstructured data objects are parsed and extracted for analyzing root causes for issues that are tracked by client tickets.

SUMMARY

Examples of the present disclosure provide at least a method and a system for parsing and aggregating unstructured data objects of the client tickets.

In one embodiment, the present disclosure provides a computer-implemented data analytical method for parsing and aggregating unstructured data objects. The method may include obtaining the unstructured data objects from description fields of records in a database comprising client tickets that may be created for application maintenance, where the unstructured data objects may contain words, numbers and characters, and transforming the obtained unstructured data objects by reading the data objects and deleting the words, the numbers and the characters if the words, the numbers and the characters match predetermined words, numbers and characters stored in a word dictionary to create transformed data objects.

The method may also include identifying a number of criteria attributes of the client tickets, where the number of criteria attributes may be determined according to at least part of the transformed data objects, word importance, word sentiment, a user input, client ticket priorities, or ticket creation date-time, or any combinations of them, and generating, for display in a first user interface, a plurality of ticket reports by aggregating the client tickets according to ranking orders of numbers of tickets for the client tickets, where the numbers of the tickets may be determined by using the identified criteria attributes.

In another embodiment, the present disclosure provides a computer-implemented data analytical system for parsing and aggregating unstructured data objects. The system may include a processor, a first user interface, a second user interface, a database, a non-transitory computer readable medium and a data communication network that links the processor, the first user interface, the second user interface, the database and the non-transitory computer readable medium together, where the non-transitory computer readable medium may store processor executable instructions including a data retriever, a data transformer, a criteria attributes selector, a report generator and a future tickets predictor.

The data retriever may be configured to cause the processor to obtain the unstructured data objects from description fields of records in the database comprising client tickets that are created for application maintenance, where the unstructured data objects may contain words, numbers and characters, and the data transformer may be configured to cause the processor to transform the obtained unstructured data objects by reading the data objects and deleting the words, the numbers and the characters if the words, the numbers and the characters match predetermined words, numbers and characters stored in a word dictionary to create transformed data objects.

The criteria attributes selector may be configured to cause the processor to identify a number of criteria attributes to reflect of the client tickets, where the number of criteria attributes may be determined according to at least part of the transformed data objects, word importance, word sentiment, a user input, client ticket priorities, or ticket creation date-time, or any combination of them, and the report generator may be configured to cause the processor to generate, for display in the first user interface, a plurality of ticket reports by aggregating the client tickets according to ranking orders of numbers of tickets for the client tickets, where the numbers of the tickets may be determined by using the identified criteria attributes.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 3 shows examples of client tickets with unstructured data objects.

FIG. 4 shows examples of client tickets with transformed data objects.

DETAILED DESCRIPTION OF ILLUSTRATED EXAMPLES

Figure 1:
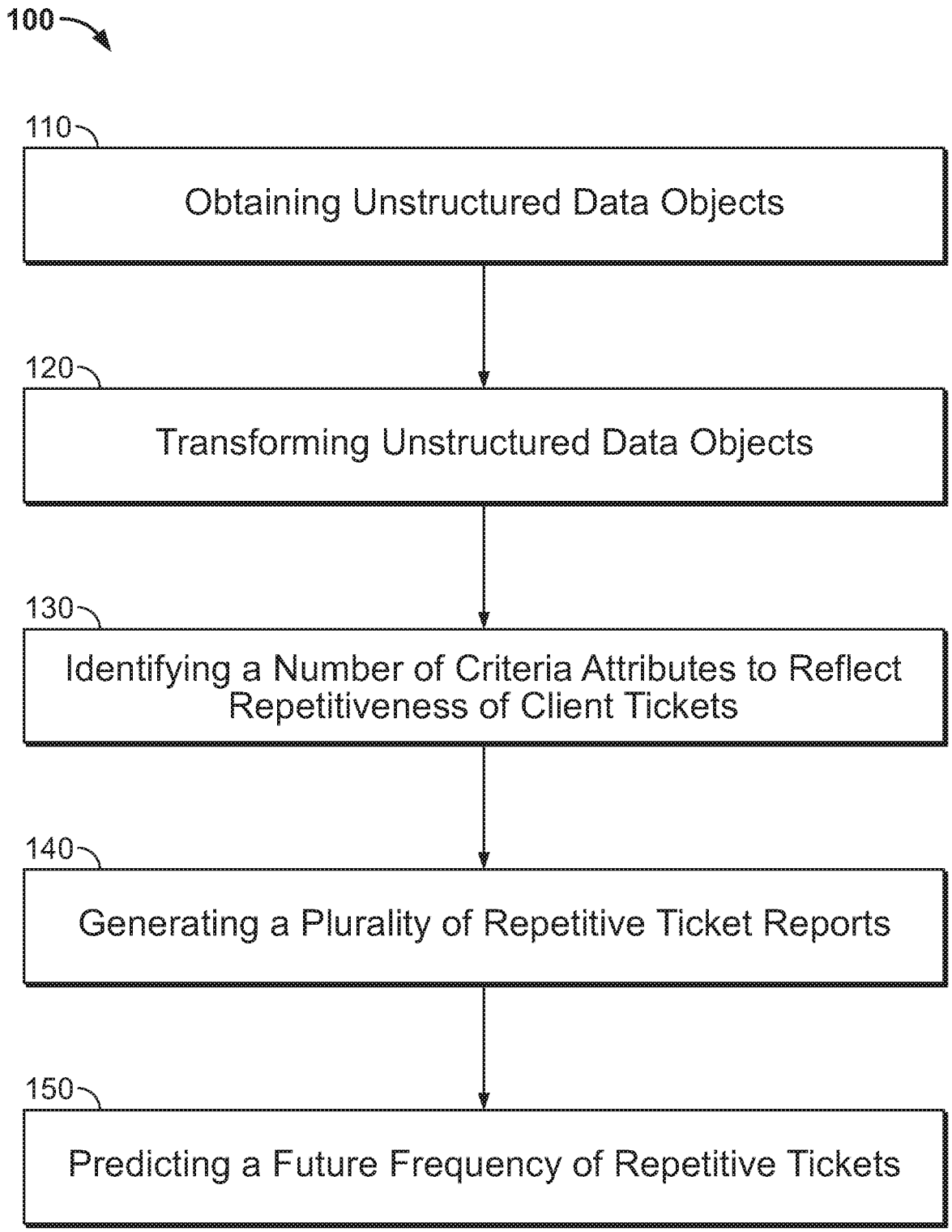
FIG. 1 is a flowchart of one embodiment of a method for parsing and aggregating unstructured data objects.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the following detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

The purpose, technical proposal and advantages in the examples of the present disclosure will be clear and complete from the following detailed description when taken in conjunction with the appended drawings. The examples described thereinafter are merely a part of examples of the present disclosure, not all examples. Persons skilled in the art can obtain all other examples without creative works, based on these examples.

A computer system may be implemented for managing and maintaining lists of issues that arise for maintaining computer applications. Each issue in the list may be called a ticket or a client ticket that may include vital information for the issues encountered. Reduction of the ticket volume is always a goal for the application maintenance services. The understanding of the repetitive tickets may help to find out the productivity improvement by reduction of the repetitive tickets. Furthermore, identifying the repetitive tickets may help the application maintenance personnel to analyze root causes of the application issue and improve the productivity for the application maintenance services.

The present disclosure discloses a method and a system that may read through the unstructured free texted objects in each ticket description of an application maintenance project, and perform an analysis of the free text objects to unleash the hidden information and identify the repetitive tickets. The method and the system may also predict the future repetitive tickets and their probable impact on the further execution of the computer applications. The method and the system may help the application maintenance project team in understanding repetitive ticket categories and thus may take specific action to reduce the ticket volume and make continuous improvement to meet the client expectation.

FIG. 1 is a flowchart of one embodiment of a method for parsing and aggregating unstructured data objects 100. Steps shown in FIG. 1 may be performed by one or more processors to execute instructions stored in non-transitory computer readable medium.

Step 110: Obtaining unstructured data objects. Examples of step 110 may include: obtaining the unstructured data objects from description fields of records in a database comprising client tickets that are created for application maintenance, wherein the unstructured data objects contain words, numbers and characters.

Client tickets may have both structured and unstructured data objects. Client tickets may be used to track maintenance issues for an application system. A computer system may be used to manage and maintain client tickets. Client tickets may have data fields. Some of data fields may be structured data objects such as date of creation, priority of the client tickets, etc. The description fields may allow the creator of the client tickets to describe the issue in free text format. As such, the description fields of client tickets may be unstructured data objects.

Unstructured data objects of description fields may contain information for analyzing the reported issues. The client tickets may normally be created by the system operators to report application maintenance issues. The client tickets may be used to investigate maintenance issues by the technical staff. The investigator of the issues may be different from the creator of the client tickets. As such, the issues of the application may be described in the description fields of client tickets that may contain sufficient details for the investigators of the issues to analyze the issues and provide technical solutions. Unstructured data objects of description fields may have detail information that may be used to analyze the application maintenance issues.

Unstructured data objects may be freely texted and may be stored in a database. The system operators may use any texts including words, numbers and characters for describing the application issues. The unstructured data objects of descriptions field of client tickets may be in free text format. After the client tickets are created, all structured and unstructured data objects of client tickets may be saved in a database. The saved client tickets may be read back and used for analyzing application maintenance issues later.

Step 120: Transforming unstructured data objects. Examples of step 120 may include: transforming the obtained unstructured data objects by reading the data objects and deleting the words, the numbers and the characters if the words, the numbers and the characters match predetermined words, numbers and characters stored in a word dictionary to create transformed data objects.

The unstructured data objects may be transformed. The unstructured data objects may be description fields of client tickets that may be input by the system operators when the client tickets are created. Once the unstructured data objects are input, the input data may be cleaned up by applying a predetermined set of transformations. Examples of such transformations may include:

Remove punctuation marks and special characters from description fields. The removed character may be replaced by a blank space. For example, for an unstructured data object "Hey!What is your name?" In this data object, the '!' is removed and replaced by a blank so that 'Hey' and 'What' may remain as two separate words. Otherwise, after the removal of '!' 'HeyWhat' would become a single word which might carry no meaning to the viewer.

Remove numeric words from text descriptions.

Remove stop words like 'an,' 'the,' 'It,' 'Is,' 'Are,' 'Was,' 'to' etc. from the unstructured data objects of description fields. There may be a customizable dictionary of stop words stored in the memory or the database that may be defined based on the stop words to be removed. Any additional word that may need to be treated as stop word may be added to that dictionary. The stop word dictionary may contain words, numbers and characters. Removal of the stop words may include the step of looking up the stop words from the stop word dictionary and removing the stop words from the unstructured data objects if they may be found from the dictionary.

Remove extra blank spaces between words in an unstructured data object of a description field.

Convert entire text description to a single case (upper case for example).

Step 130: Identifying a number of criteria attributes to reflect repetitiveness of client tickets. Examples for step 130 may include: identifying a number of criteria attributes to reflect repetitiveness of the client tickets, wherein the number of criteria attributes are determined according to at least part of the transformed data objects, word importance, word sentiment, a user input, client ticket priorities, or ticket creation date-time, or any combination thereof.

The repetitive client tickets may be found by using the unstructured data objects of the description fields. The unstructured data objects in client tickets may be entered by the system operators when application maintenance issues arise. Each client ticket may be associated with one issue. Because the application system may have similar issues that occur repeatedly for a period of time, the client tickets may be repeated. For example, the "password reset" issue may occur many times for an application system for first ten days of January. As such, there may be a number of repetitive client tickets for the "password reset" that are created for the first ten days of January. Because all "password reset" client tickets may be for the same issue, they may be described similarly. As such, the unstructured data objects for those "password reset" client tickets may have certain similarities. After client tickets are created and are saved in the database, the repetitive client tickets may be found by identifying similarities of unstructured data objects for those tickets.

The number of client tickets may be large. The number of client tickets depends on the size and complexity of the application system maintained and the length of the time that the client tickets may be kept and evaluated. There may be many issues that occur for running the large application system. As such, there may be many client tickets that are created for large application system. The larger and complex the application system may be, the bigger the number of client tickets may be created and kept. The client tickets may be accumulated with the time being. The longer the client tickets may be kept, the more client tickets exist. Because generally the client tickets may be created and kept in the client tickets maintenance system and stored in the database for a long period of time, the number of client tickets may be large. As the number of client tickets may be large in count hence it may not be feasible to manually analyze the description of the ticket and understand its nature.

A number of criteria attributes for repetitive tickets may be developed and identified for analyzing repetitive client tickets. There may be many criteria attributes for analyzing repetitive client tickets by parsing the unstructured data objects of description fields of client tickets. For example, the criteria attributes may be word counts of each word in the unstructured data objects among all client tickets being analyzed. The repeated words ranking for the unstructured data objects may be generated by using the word counts of each word.

The priority of each client ticket may be used as criteria attributes. Each client ticket may have a priority to indicate how important the client ticket may be. The priority may be P1, P2, P3, P4 and P5. Among them, P1 ticket may be the most important ticket and P5 ticket may be the least important ticket. P1 to P5 may be one of the most common terminologies for priorities used, however it may not restricted only to these terminologies and may vary from one client application system to another. For example instead of P1, P2, P3 etc., it may also be termed as Critical, High, Medium etc. by some client application system. The number of priorities may not be limited to 5 all the time. It may be more than five or less than five. The priority of client ticket may be used as one of criteria attributes for analyzing the repetitive client tickets.

The criteria attributes may include a part of unstructured data objects. For example, the first two words of each transformed data objects may be used as criteria attributes. The first two words of unstructured data objects may be extracted and the client ticket analysis may be conducted based on the extracted first two words. Other number of words may also be used, for example, first three (3) words, first four (4) words or any other number of words at the beginning, in the middle or at the end of the unstructured data objects. Additionally, a user input may be taken from a user interface to allow a user to enter the number of words along with the starting position of the words—starting, middle or end of unstructured data objects that may be extracted and analyzed.

Word importance and word sentiment may be criteria attributes. Each word in a single word analysis may be determined as important or unimportant. For example, when a word count may specify the total number of times a word is repeated in the ticket descriptions for all the tickets analyzed under that a selected priority, and a maximum word count in a single description may specify the maximum number of times a word is repeated within a single ticket description of the selected ticket priority, an importance index may be the ratio between the maximum word count in a single description and the word count. If the value of the ratio is more than or equal to a predefined threshold value (e.g. 0.2, 0.4 etc) then the word may be considered unimportant, otherwise, the word may be important. When the value of ratio exceeds the threshold, it may indicate a single word may repeat many times in a single description. As such, the word may not be so important for the repetitive client tickets analysis because it may imply that the particular word may be localized only within few set of tickets.

Word sentiment may also be criteria attributes. The word sentiment analysis may evaluate each and every word and categorize the word. For example, a word may be categorized as either of "Neutral", "Attention" or "Negative". The word sentiment may catch the attention of the users to those critical words in context of application maintenance. For example, based on the word importance and word sentiment, the users may prioritize those words and perform further details analysis to find root cause for the issue the client ticket is created for. The words may be tagged as "Attention" or "Negative" according to a customizable dictionary defined separately. Different application maintenance teams may pick and choose different critical words. The application maintenance teams may have their own list of critical words which they may enter in the dictionary under either "Attention" or "Negative" or distribute between both the categories. Typically a word which may have considerable value and may need immediate attention for the application maintenance team may be put under "Attention". Words which may have considerable value but may not require immediate attention may be categorized under "Negative". A default value may be set for all words, for example, a default value of "Neutral" may be set for all words initially.

Criteria attributes may be used in combination. For example, an important word may be associated with a certain client ticket priority (P2 for example). The part of unstructured data objects (first two words for example) may also for a certain client ticket priority (P3 for example). In fact, for the client ticket analysis purpose, any combinations of criteria attributes mentioned above may be used.

Step 140: Generating a plurality of repetitive ticket reports. Examples of step 140 may include: generating, for display in a first user interface, a plurality of repetitive ticket reports by aggregating the client tickets according to ranking orders of numbers of repetitive tickets for the client tickets, wherein the numbers of the repetitive tickets are determined by using the identified criteria attributes.

Repetitive client tickets may be aggregated according to a ranking order. For example, by a ranking order, each word in the unstructured data objects or transformed data objects of all client tickets evaluated may be displayed in a user interface. The word with biggest word count may be displayed in a biggest size, and the word with smallest word count may be displayed in a smallest size, and other words may also be displayed according to the ranking order of word counts. As such, a repetitive ticket report may be generated to include a word cloud that generates a word visualization view by showing most recurring words of the unstructured data objects or transformed data objects in a largest font.

The repetitive ticket report may be a pie chart. A word distribution by priority may be created by extracting individual words from the unstructured data objects or transformed data objects. The extracted individual words may be categorized according to the client ticket priorities and create a pie chart for display.

Figure 7:
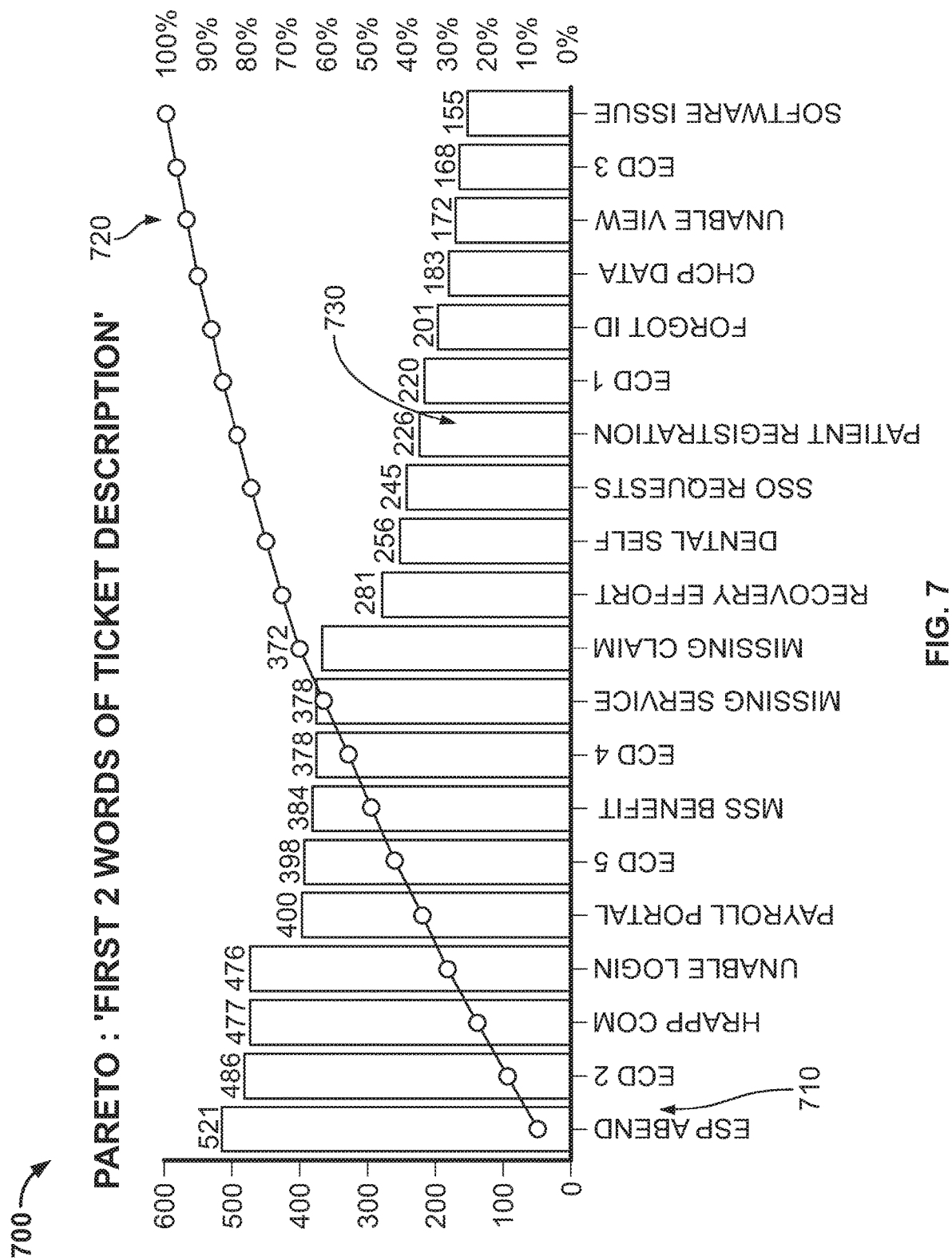
FIG. 7 shows an example of a two-word pareto chart for client tickets.

Pareto charts may be used for displaying the aggregated repetitive client tickets. A pareto chart may be a type of chart that contains both bars and a line graph, where individual values may be represented in descending order by bars, and the cumulative total is represented by the line. For example, ticket counts for first two words of the unstructured data objects or transformed data objects may be derived by a computer system to read through unstructured data objects or transformed data objects of client tickets from the data-based for the past year for an application system. Then, the bars may be constructed to represent the ticket counts in descending order for each of the first two words and a line graph may be developed according to the cumulative total of the ticket counts for the first two words. FIG. 7 shows an example of the parto chart for "first two words of ticket description."

Figure 10:
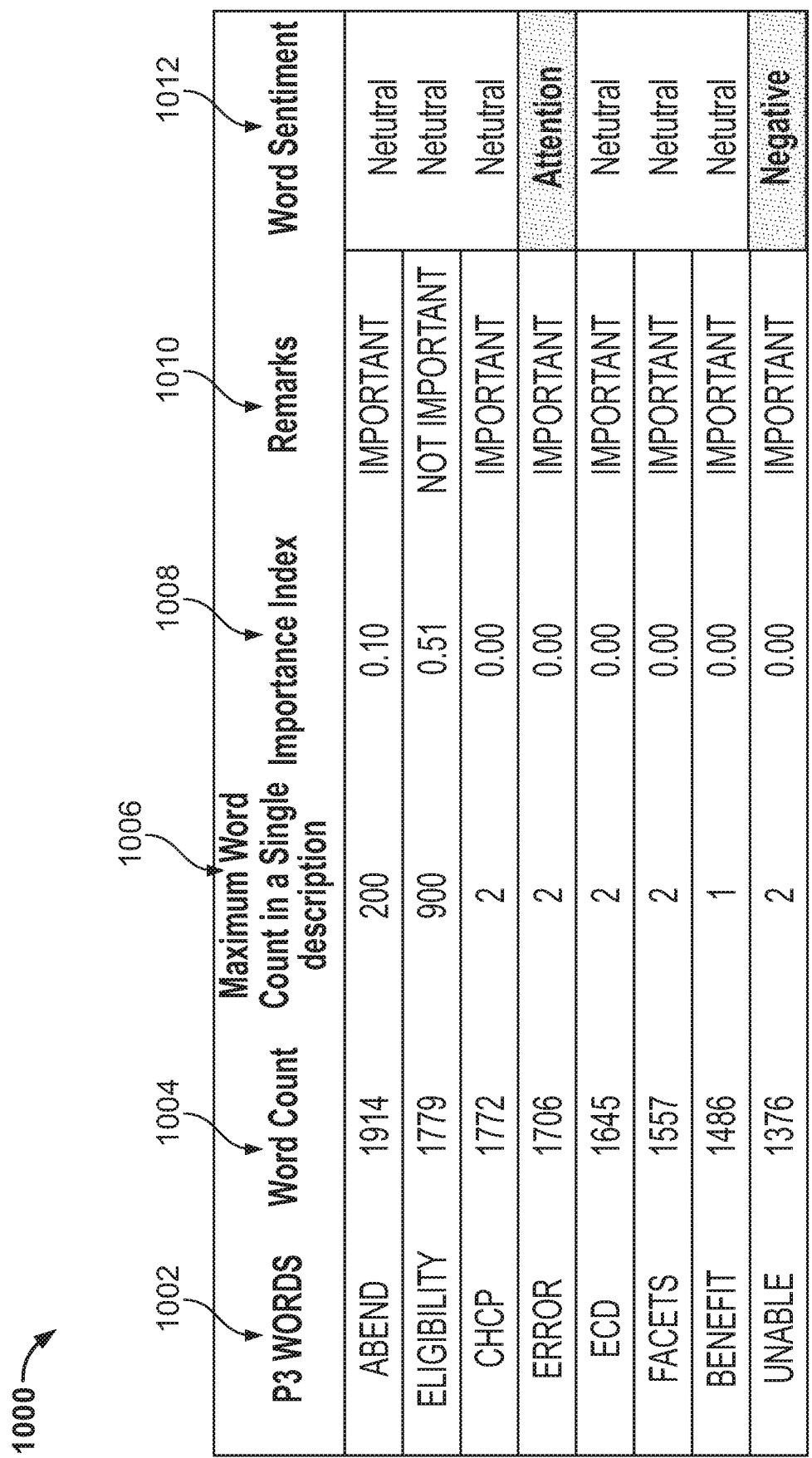
FIG. 10 shows an example of individual words report.

A table report may be generated for displaying the word importance and word sentiment. Each word in the unstructured data objects or transformed data objects of client tickets to be evaluated may be displayed in a table with word count, a maximum word count in a single description, an importance index showing a ratio between the maximum word count and the total word count, an important/unimportant field for word importance according to a ratio between the maximum word count in a single description and the word count, and a word sentiment according to the determination of the word sentiment for a particular word. FIG. 10 shows an example of a table report.

Reports may also be generated to show correlations between one word to a few other words in the unstructured data objects or transformed data objects of client tickets. For example, a report may include word correlation analysis by reading and displaying top 10 words for a client ticket priority that may be most closely associated with a selected word from a dropdown selection presented in a user interface.

There may be further report to for showing client tickets for different priorities and showing repetitive client tickets for a certain criteria attribute for different time periods such as by day, by month or by a certain month of a year. A repetitive ticket report may include top recurring words by day of month and month of year that may categorize and display the top few recurring words for each day of the month and for each month of the year. For example, the word "PASSWORD" and "LOGIN" may be the top 2 recurring words on each day for first five (5) days of the month. This may be an indication that the password and login related issues may have a peak during first five (5) days of the month. This may not only help the maintenance support team to conduct root cause analysis and provide a permanent solution to the issue, but also may help them in understanding the duration during which they may staff properly to provide faster resolution to all the Password and Login issue related tickets for the first five (5) days of the month till the time the permanent fix may be provided.

Sometimes, client tickets may be categorized to appropriate groups. For example, a list of keywords and resolver group names from the user as input may be accepted. Based on these keywords, the tickets may be categorized by reading through the description and be classified under appropriate resolver groups. This may help the users in verifying whether a ticket has been assigned to the appropriate resolver group. Such functionality would show and/or remediate assigning of tickets to different groups who may not solve these tickets and save a lot of manual effort in doing the assignment and thus may improve the productivity and turnaround time for resolving the tickets.

Step 150: Predicting a future frequency of repetitive tickets. Examples for step 150 may include: predicting, for display in a second user interface, a future frequency of the repetitive tickets for upcoming periods according to the aggregated client tickets, and forecasting maintenance workloads for the upcoming periods according to the predicted future frequency of the repetitive tickets.

The future repetitive tickets may be predicted by parsing and aggregating the historical repetitive tickets. The future repetitive tickets prediction may be performed by using combination of statistics & time series with the defined confidence level. The statistical techniques like regression & time series may be used to predict the inflow considering three (3) components of any types of volume: seasonality, trend & regular variation. An equation with these components & coefficients from regression may be used to forecast the inflow with 5 to 8% variation which may be referred here as tolerance limit. Similarly, standard deviation as per sigma level may be used to define lower & upper limits of forecasted volume. This model may reflect the confidence level of prediction through a R square value.

The prediction for inflow tickets may be generated by following steps:
  1. Determines central moving average of weekly volume;
  2. Calculates seasonality & regular Component;
  3. Derives seasonal component;
  4. Calculate de-seasonalized volume;
  5. Runs the regression and calculates trend factor of volume;
  6. Predicts the ticket volume by using the derived the equation. For example, the equation may be: $Y_t = S_t * T_t$ represents: Predicted Output=Seasonal Component*Trend.

The predicted future tickets may be used to forecast the future workload. For example, when an average effort to resolve a specific category of repetitive ticket is entered by using a user interface, and a percentage (%) reduction target of tickets for upcoming weeks may be obtained through a user interface, the future workload such as the amount of effort savings per week in the future may be foreseen when the future tickets inflow is predicted.

Figure 2:
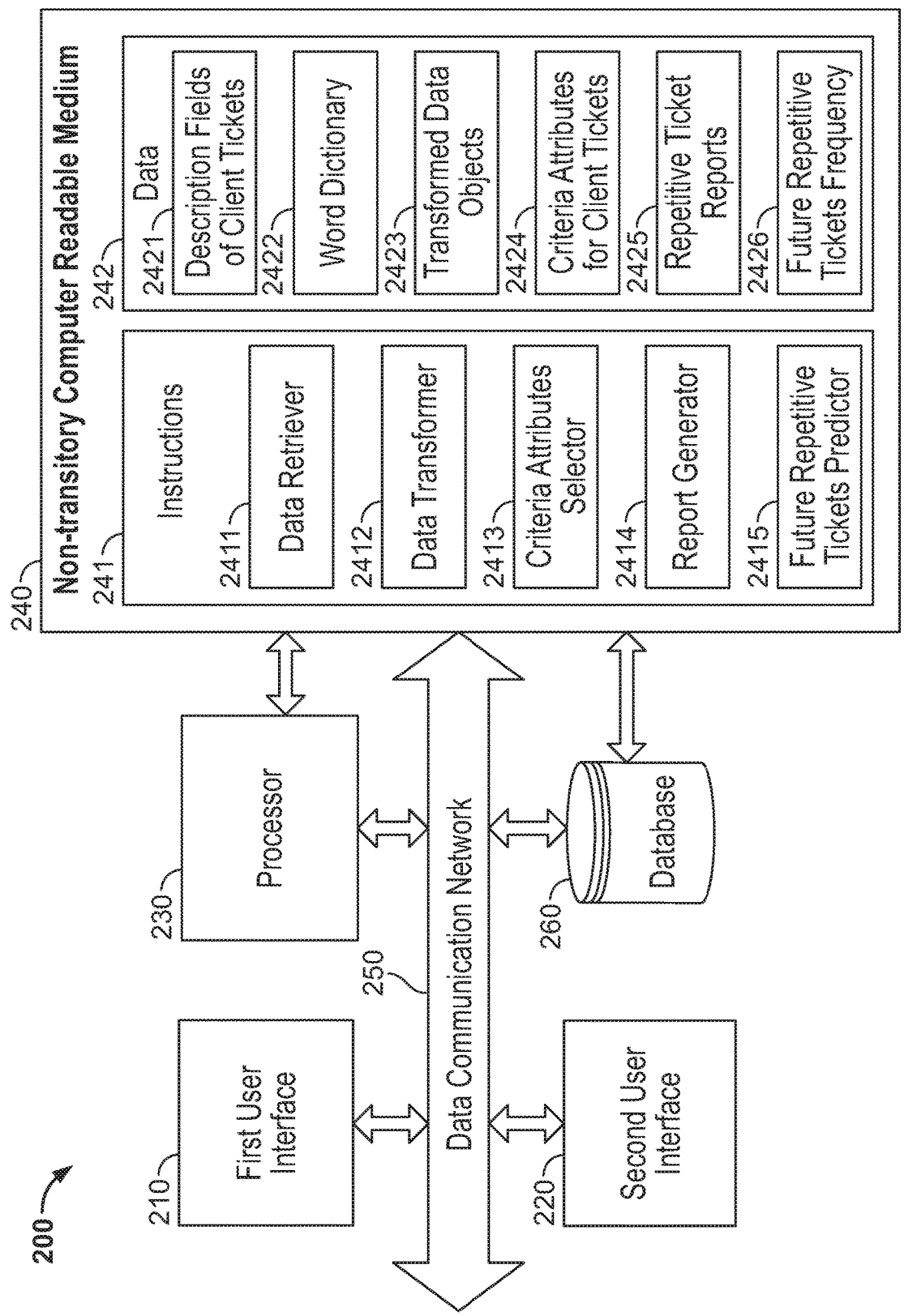
FIG. 2 illustrates one embodiment of a system for parsing and aggregating unstructured data objects.

FIG. 2 illustrates one embodiment of a system for parsing and aggregating unstructured data objects 200. As shown in FIG. 2, the computer-implemented data analytical system for parsing and aggregating unstructured data objects may include: a processor 230, a first user interface 210, a second user interface 220, a database 260, a non-transitory computer readable medium 240 and a data communication network 250 that is in communication with the processor 230, the first user interface 210, the second user interface 220, the database 260 and the non-transitory computer readable medium 240, where the non-transitory computer readable medium 240 may store processor executable instructions 241 having comprising a data retriever 2411, a data transformer 2412, a criteria attributes selector 2413, a report generator 2414 and a future tickets predictor 2415. The non-transitory computer readable medium 240 may store data 242 that may include unstructured data objects of client ticket descriptions 2421, word dictionary 2422, transformed data objects 2423, criteria attributes for client tickets 2424, repetitive ticket reports 2425 and future repetitive tickets 2426.

The data retriever 2411 may be configured to cause the processor 230 to obtain the unstructured data objects 2421 from description fields of records in the database 260 comprising client tickets that are created for application maintenance, where the unstructured data objects may contain words, numbers and characters.

The data transformer 2412 may be configured to cause the processor 230 to transform the obtained unstructured data objects 2421 by reading the data objects and deleting the words, the numbers and the characters if the words, the numbers and the characters match predetermined words, numbers and characters stored in a word dictionary 2422 to create transformed data objects. The data transformer 2412 may further include processor executable instructions that may cause the processor 230 to transform the obtained unstructured data objects by removing punctuation marks and special characters, and/or replacing the removed characters with blank spaces.

The criteria attributes selector 2413 may be configured to cause the processor 230 to identify a number of criteria attributes 2424 to reflect repetitiveness of the client tickets, where the number of criteria attributes may be determined according to at least part of the transformed data objects, word importance, word sentiment, a user input, client ticket priorities, or ticket creation date-time, or any combination thereof.

The report generator 2414 may be configured to cause the processor 230 to generate, for display in the first user interface, a plurality of repetitive ticket reports 2425 by aggregating the client tickets according to ranking orders of numbers of repetitive tickets for the client tickets, wherein the numbers of the repetitive tickets may be determined by using the identified criteria attributes.

The report generator 2414 may be further configured to cause the processor 230 to generate the plurality of repetitive ticket reports comprising a word cloud that generates a word visualization view by showing most recurring words of the transformed data objects in a largest font.

The report generator 2414 may be configured to cause the processor 230 to generate the plurality of repetitive ticket reports comprising a word distribution by priority by extracting individual words from the transformed data objects and categorizing the individual words according to the client ticket priorities to create a pie chart.

The report generator 2414 may be configured to cause the processor 230 to generate the plurality of repetitive ticket reports comprising a pareto chart by extracting more than one word from each description field.

The report generator 2414 may be configured to cause the processor 230 to generate the plurality of repetitive ticket reports comprising an individual word pareto chart by extracting individual words from the description fields (unstructured data objects or transformed data objects) and categorizing the extracted individual words in the individual word pareto chart according to the clients ticket priorities. Also, the report generator 2414 may mark each of the extracted individual words as the important word if a ratio value for the word is more than or equal to a predefined threshold. In addition, the sentiment of individual word according to a predetermined rule may be determined and displayed in a user interface. For example, the user of the system may define a sentiment dictionary, and may define certain words as attention, negative and any other categories. All individual words may have a default sentiment value of neutral.

The report generator 2414 may be configured to cause the processor 230 to generate the plurality of repetitive ticket reports comprising top recurring words by day of month and month of year that categorize and display the top few recurring words for each day of the month and for each month of the year.

The report generator 2414 may be configured to cause the processor 230 to generate the plurality of repetitive ticket reports comprising word correlation analysis by reading and displaying top 10 words for a client ticket priority that that are most closely associated with a selected word from a dropdown selection presented in the first user interface 210.

The report generator 2414 may be configured to cause the processor 230 to generate the plurality of repetitive ticket reports comprising categorization of the client tickets for appropriate groups by accepting a list of keywords and resolver group names as the user input, and categorizing the client tickets according to the list of keywords and the resolver group names.

The future tickets predictor 2415 may be configured to cause the processor 230 to predict, for display in the second user interface, a future frequency of the repetitive tickets 2426 for upcoming periods according to the aggregated client tickets, and forecast maintenance workloads for the upcoming periods according to the predicted future frequency of the repetitive tickets.

FIG. 3 shows examples of client tickets with unstructured data objects 300. As shown in FIG. 3, a client ticket may have a ticket ID 310, a ticket description 320, a ticket priority 330 and a ticket date 340. The ticket description 320 is in free text format. As such, the ticket description may be considered an unstructured data object.

A ticket may have other elements. For example, in addition to these four elements ID, description, priority and date shown in FIG. 3, there may be other elements such as status, assignee, geography etc.

FIG. 4 shows examples of client tickets with transformed data objects. As shown in FIG. 4, a transformed client ticket may also have a ticket ID 410, a ticket description 420, a ticket priority 430 and a ticket date 440 as shown in FIG. 3. However, in FIG. 4, the free texted ticket description 420, may also be called unstructured data objects, has been transformed. By comparing with the unstructured data object 350 in FIG. 3, which has "19-EU-SD:PZSD_MAIN_META1," the transformed data object 450 in FIG. 4 has been transformed to: "19 EU SD PZSD_MAIN_META1." As seen, the punctuations have been removed and replaced with blanks.

Figure 5:
FIG. 5 shows an example of a word cloud report.

FIG. 5 shows an example of a word cloud report. As shown in FIG. 5, a word visualization view in form of word cloud is generated for individual words of the transformed data objects. Such a word cloud may help the user in understanding the most recurring words in the entire set of ticket descriptions, which may give high level indication about the probable areas of repetitive tickets. The word cloud may be generate with following steps:

1. Read through each and every descriptions of the tickets provided in the input,
2. Extract each and every individual word from each description and keep a counter to count how many times each word has recurred in the entire data set (This set of words may only be counted for the transformed data objects and may not contain the list of words which are removed based on the predefined dictionary of the words to be removed),
3. Sort the words in descending order with respect to the number of recurrence of the words,
4. Display the words in form of word cloud as in FIG. 5,
5. The words in the word cloud which appear in larger fonts are the top recurring words in the data set. Lesser is the font of words in the word cloud, lower is the recurrence of the word in data set. As shown in FIG. 5, the most recurring word "process" 510 is shown in the largest font.

Figure 6:
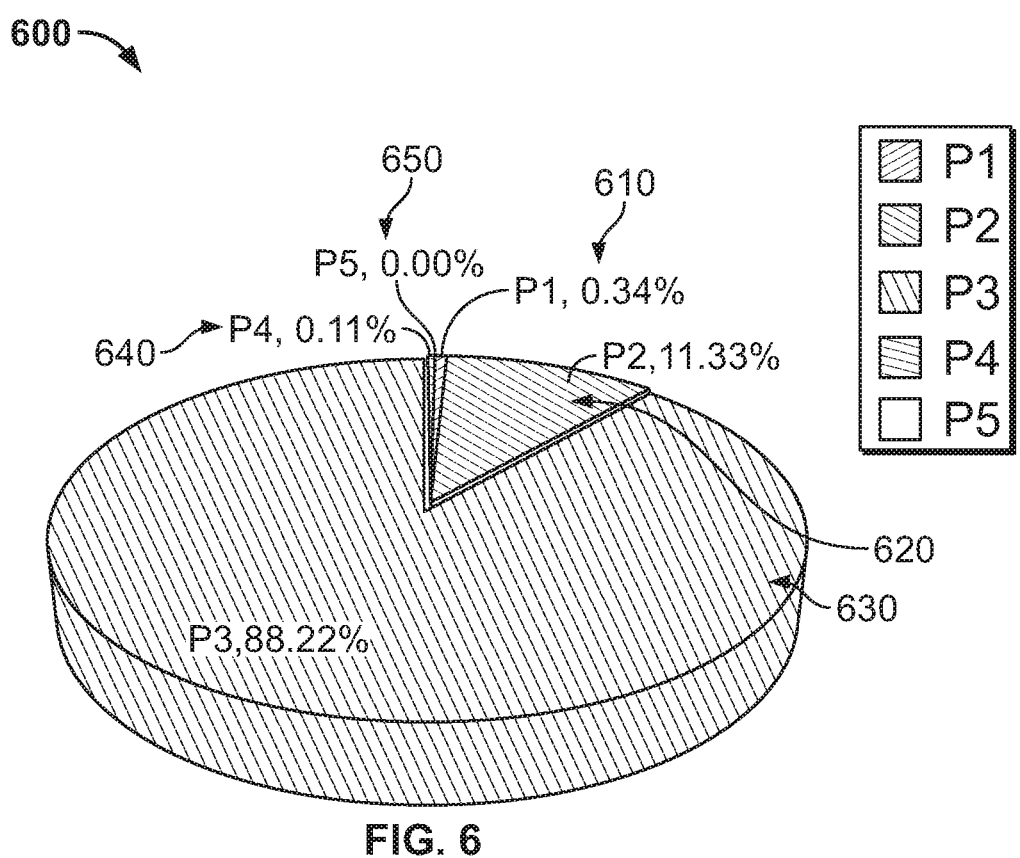
FIG. 6 shows an example of a word distribution report by priority.

FIG. 6 shows an example of a word distribution report by priority. As shown in FIG. 6, the individual words are parsed and extracted from each transformed data object. The words are categorized between P1 to P5 and a pie chart is created based on that. The pie chart may help the user to visually understand the distribution of words as well as the distribution of tickets across the ticket priorities. As shown in FIG. 6, the transformed data objects of priority P1 610 tickets contain 0.34% of total words, the transformed data objects of priority P2 620 tickets contain 11.33% of total words, the transformed data objects of priority P3 630 tickets contain 88.22% of total words, and the transformed data objects of priority P4 630 tickets contain 0.11% of total words, and the transformed data objects of priority P5 650 tickets contain 0.00% of total words. According to the pie chart in FIG. 6, the transformed data objects of priority P3 630 has the most amount of words and the transformed data objects of priority P5 650 has least amount words.

FIG. 7 shows an example of a two-word pareto chart for client tickets. In order to create the two-word pareto chart. The first two words from each transformed data objects may be extracted and a Pareto chart may be created based on that. The pareto chart may help the user to understand the categories of repetitive tickets present in the unstructured data objects. The pareto chart may also help to prioritize the repetitive ticket categories. For example, the pareto chart may be read based on 80-20 principle which generally implies that 20% of the categories are responsible for 80% of the causes of issues of the client tickets. As shown in FIG. 7, the top category is "ESP ABEND" 710. The bar for "ESP ABEND" 710 shows that there are 521 tickets out of the total number of ticket volume for this category. As such, there are 521 abnormal terminations of automated jobs in the ESP application. FIG. 7 also shows a curve 720 with the cumulative percentage of each category that is represented by the vertical bars. According to FIG. 7, the cumulative point 730 may mean the issues that are represented by the combination of vertical bars starting from 'ESP ABEND' to 'PATIENT REGISTRATION' combine, may be responsible for 80% of causes for the issues tracked.

Figure 8:
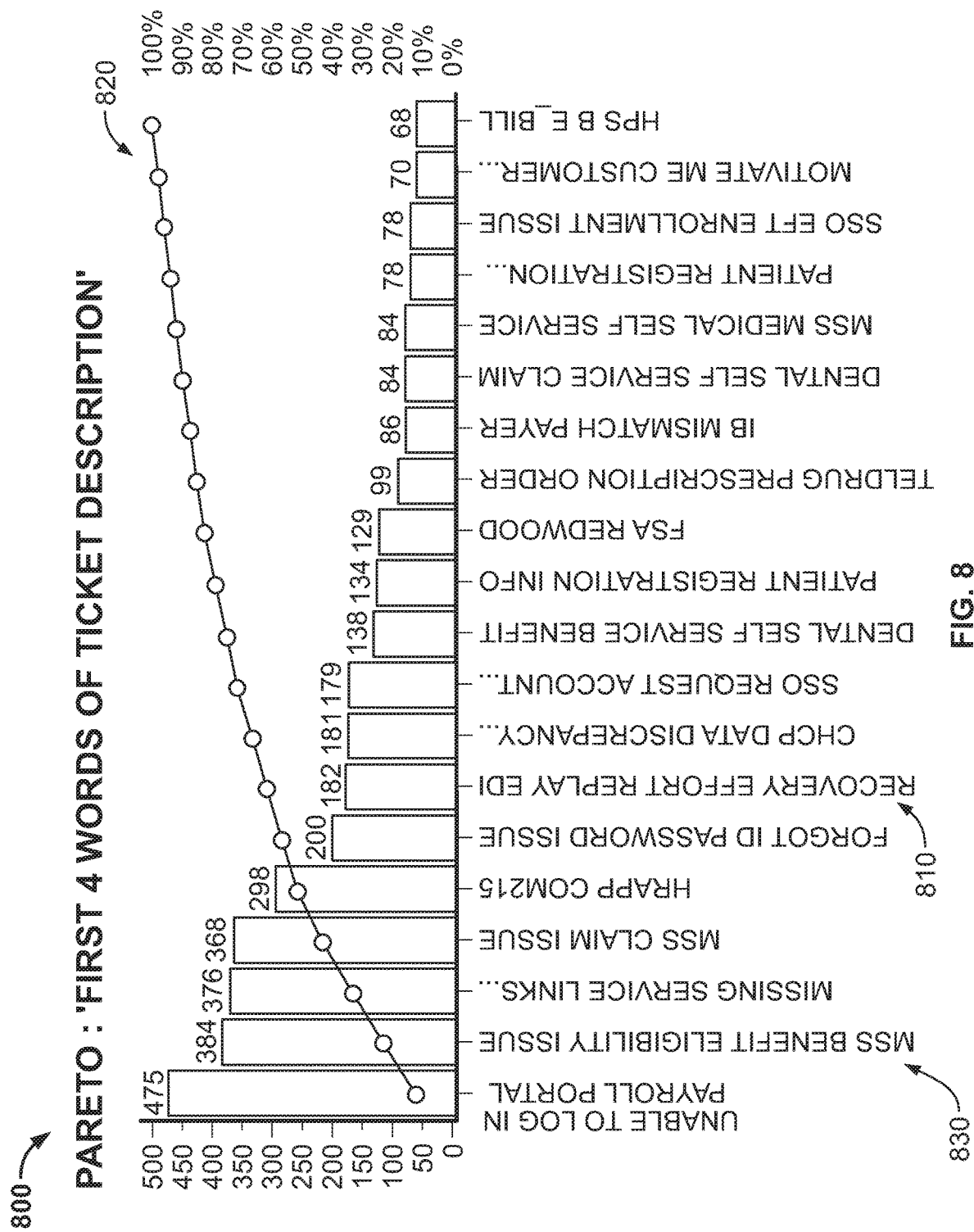
FIG. 8 shows an example of a four-word pareto chart for client tickets.

FIG. 8 shows an example of a four-word pareto chart for client tickets. The first four words from each transformed data objects may also be extracted for creating a Pareto chart. As shown in FIG. 8, the category "RECOVERY EFFORT REPLAY EDI" 810 has 182 tickets created among all client tickets evaluated. FIG. 8 also shows a curve 820 with the cumulative percentage of tickets that are represented by the vertical bars of first four words categories. As illustrated in FIG. 8, not all descriptions have four words in the pareto chart. For example, the second top category "MSS BENEFIT ELIGIBILITY" 830 may only show three (3) words. When a four-word pareto may is created, if the length of the description field is greater than or equal to the four words selected then it may display all first four words. If the length of the description field is less than four words then it may display all the words, which is less than four words.

Figure 9:
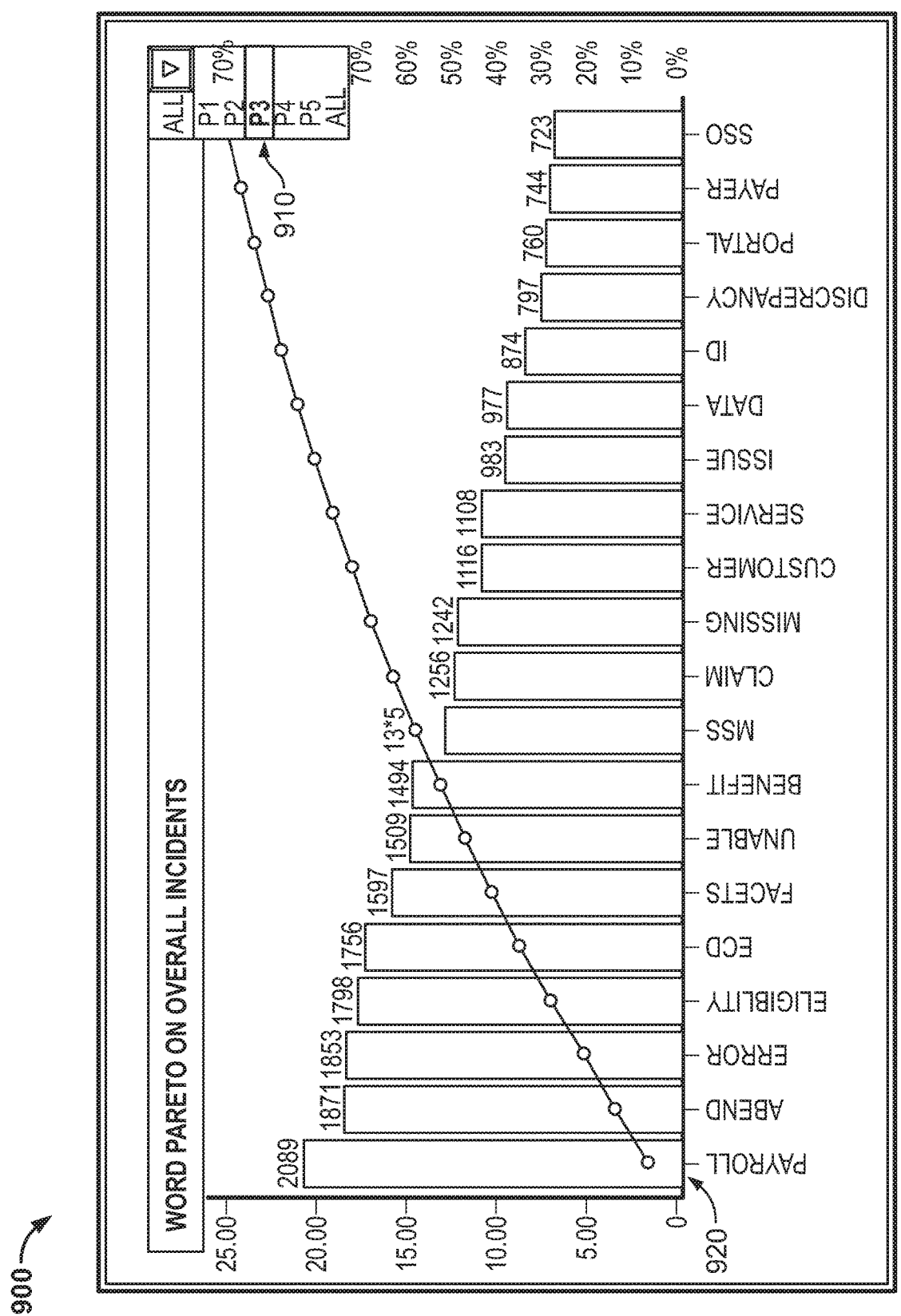
FIG. 9 shows an example of a word pareto chart on individual words.

FIG. 9 shows an example of a word pareto chart on individual words. The individual words from unstructured data objects may be extracted and categorized in a Pareto chart for the different priority of tickets. As shown in FIG. 9, the top 20 repeating words 920 for each of the priorities from P1 to P5 910 are extracted and are used to construct a pareto chart. This chart may help the user to understand the top words repeated in each of the priority of the tickets.

The pareto chart may be constructed by any number of words. The any number of words may be the first N words, middle N words or last N words of the unstructured data objects or transformed data objects. In addition, there may be a user interface to allow a user to enter any options of words discussed above to construct the pareto chart. For example, a user interface may be built to allow the user the flexibility to enter the number of words and position of words to be selected for building the pareto chart.

Some numeric values may not be eliminated during the data transformation. Some numeric values may be useful for forming the pareto charts and should not be eliminated when the transformed data objects are transformed from unstructured data objects. For example, numeric values of "Release 10" or "Server 03" may indicate the release number or the server number and are useful for the user to see them in the pareto charts, and therefore should not be eliminated during the data transformation. However, a pure number as an independent value may still be eliminated as it may not carry any significant information for the user.

FIG. 10 shows an example of individual words report. Individual words extracted from unstructured data objects or transformed data objects may be displayed in a table for evaluating the importance of each word as well as the sentiment of each word. As shown in FIG. 10, 'P3 words' column 1002 shows the top individual words for priority P3 tickets. 'Word Count' column 1004 specifies the total number of times a word is repeated in the unstructured data objects (transformed ticket descriptions) considering all the tickets under that selected priority. The 'maximum Word count in a single description' column 1006 specifies the maximum number of times a word is repeated within a single ticket description of the selected ticket priority. The 'Importance Index' column 1008 is the ratio between the column 'Word Count' and 'maximum Word count in a single description'. If the value of the ratio is more than or equal to a threshold value (e.g. 0.2, 0.4 etc) then the 'Remarks' column 1010 says 'NOT IMPORTANT' else it says 'IMPORTANT'. The threshold value is something which can be defined by the user depending on the volume and complexity of the data. In FIG. 10, the threshold value is 0.5. However, it may be changed every time by the user before starting the analysis objective. The purpose of importance analysis may be to understand if a particular word is localized within few tickets or it is spread across multiple tickets. If the word is spread across multiple tickets, then that word may be of importance to the user, otherwise unimportant.

The word sentiment analysis may evaluate each and every word and categorize the word as either of "Neutral", "Attention" or "Negative". The objective of word sentiment analysis may be to catch the attention of the users to critical words in context of application maintenance projects. The user, based on the word importance and word sentiment, may prioritize those words and perform root cause analysis. As shown in FIG. 10, the words are tagged as "Neutral," "Attention" or "Negative." The tags depend on a customizable dictionary defined at the backend. The definition of a critical word may depend on the project team and the user. The maintenance project team may have its own list of critical words which they may enter in the dictionary under either "Attention" or "Negative" or distribute between both the categories. In general, a word which may have considerable value and may need immediate attention for the project team may be put under "Attention". Words which may have considerable value but may not require immediate attention may be categorized under "Negative." All words may have a default of "Neutral."

Figure 11:
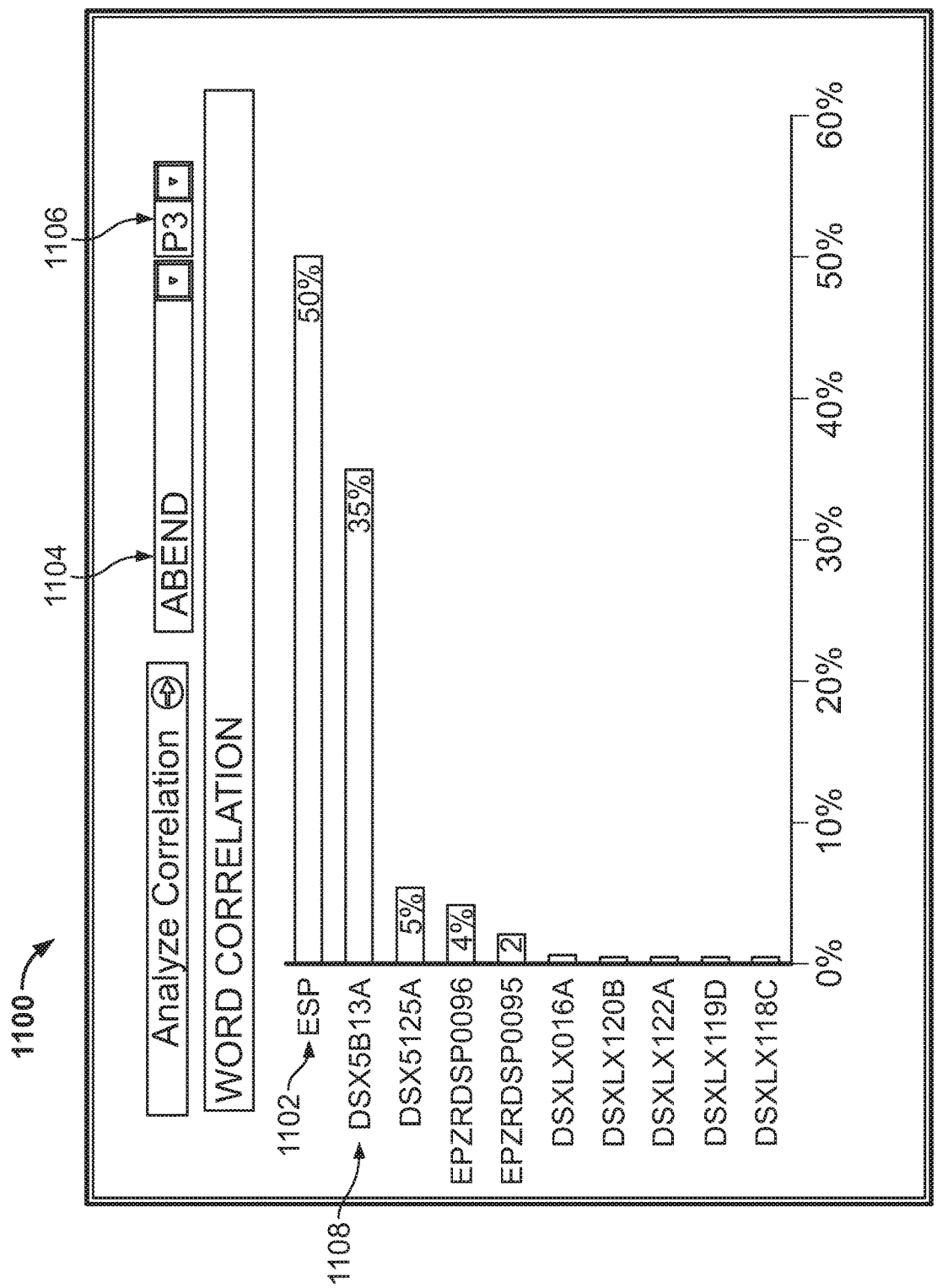
FIG. 11 shows an example of word correlation analysis.

FIG. 11 shows an example of word correlation analysis. As shown in FIG. 11, the user may select any word from the dropdown 1104 and select the corresponding priority 1106. A computer system may read through all the unstructured data objects (or transformed ticket descriptions) of the selected priority and display top 10 words which may be most closely associated with the word selected. Closely associated words in this case refers to the words on immediate left and immediate right of the selected word that are found in the ticket descriptions. The word correlation analysis may also provide the percentage of time the top 10 words are associated with the selected word.

As shown in FIG. 11, the dropdown 1104 may display the top 50 words for each of the priorities. The user may also type in any word which is not in the dropdown list 1104. The system shows the top 10 words which are found either on immediate left or immediate right of the word ABEND in the ticket descriptions considering all the tickets of priority P3. Also in FIG. 11, the top two (2) correlated word with ABEND (which means abnormal termination) are ESP 1102 and DSX5B13A 1108. While ESP may be an application, DXS5B13A may the identifier for an automated job which may run in the application. The jobs that are associated with DSX5B13A shown in FIG. 11 may be executing unsuccessfully and getting abnormally terminated. The user may use prioritized words such as words with sentiment values of "Attention" or "Negative" in the word correlation analysis. The user may also be allowed to enter a set of words for the word correlation analysis, and the system may identify the tickets containing the exact set of those words and conduct the word correlation analysis.

Figure 12:
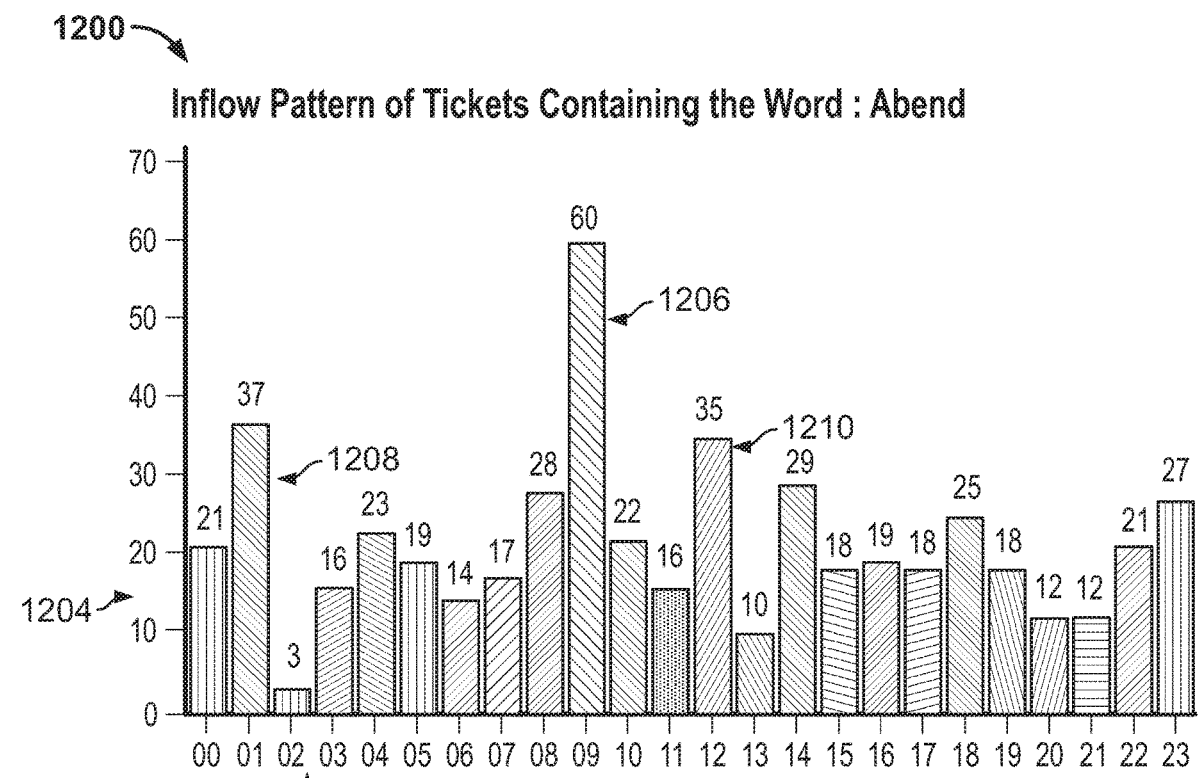
FIG. 12 shows an example of inflow pattern of tickets containing a single word which is based on user selection.

FIG. 12 shows an example of inflow pattern of tickets containing a single word. The system may analyze the inflow pattern across twenty-four (24) hours of the day of all the priority P3 tickets containing the word ABEND and the top 10 associated words. As shown in FIG. 12, the vertical bars show the number of tickets 1204 related to word ABEND for a particular hour 1202 during a day. For example, the inflow of the ABEND related tickets has periodic peaks at 1 AM 1208, 9 AM 1206 and 12 PM 1210. It may further found that the server capacity may exceed the certain limits during these points of times in the day due to the job failures. This analysis may help the maintenance support team to find the root cause and provide a fix to the system issues.

Additionally, the system may provide a user interface allowing the user to select any of the correlated words along with the selected word for which the correlation was done, and to find the inflow pattern of the tickets. For example, for the above case, the user may select any of the top 10 correlated words found for the word ABEND and use that word along with ABEND for finding the inflow pattern of the tickets.

Figure 13:
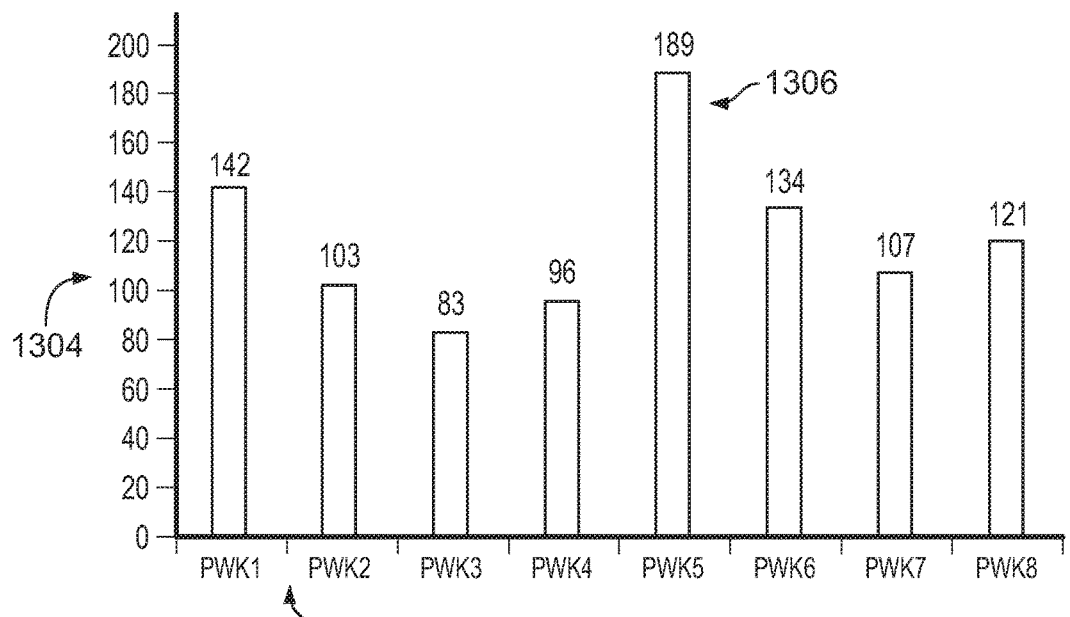
FIG. 13 shows an example of prediction of repetitive tickets.

FIG. 13 shows an example of prediction of repetitive tickets. The tool may predict the number of repetitive tickets for an upcoming period, for any of the category of repetitive tickets. Based on the prediction, the maintenance team may come up with preventive measures in mitigating the risks in the upcoming weeks. The prediction may also help the team in optimizing the cost, as well as deciding on the right team size and right team structure for the application maintenance.

The computer system disclosed in the present disclosure may first analyze the historical data (from the input data provided) of the detected repetitive ticket categories. By using the historical data the system may find the weekly inflow volume and may take seasonal impact present in the data into account. After that, the system may create a regression equation (standard statistical method) through which the number of repetitive tickets may be predicted. The output of the predictive analysis may be the number of repetitive tickets predicted for upcoming weeks or months as shown in FIG. 13. The value of R-Square 1308 representing the strength of prediction may also be provided. R-Square may be a statistical value which signifies the strength of the prediction. The closer is the value of R-Square is to 1, the higher is the strength of the prediction. R-square may give the user the confidence on the predicted values for the upcoming weeks and may help the user to take appropriate actions for the upcoming weeks.

As shown in FIG. 13, the prediction for repetitive tickets containing ESP ABEND is conducted. The result predicts the number of tickets 1304 for upcoming eight (8) weeks 1302. The most tickets upcoming are predicted to be $5^{th}$ week 1306 with one hundred and eight nine (189) tickets. The prediction may be done in a real time basis in the maintenance project to help the maintenance project teams to continuously evaluate the nature of the tickets with respect to the daily inflow.

Statistics & time series may be used together to be able to predict volume with defined confidence level. Statistical techniques like regression & time Series may be used to predict inflow considering three (3) components of any type of volume. For example, seasonality, trend & regular variation. An equation with these components & coefficients from regression may help us to forecast inflow with five (5) to eight (8) percent (%) variation which may be defined as a tolerance limit. Similarly, standard deviation as per sigma level may help to define lower & upper limits of forecasted volume. This model may reflect confidence level of prediction through R Square Value.

Figure 14:
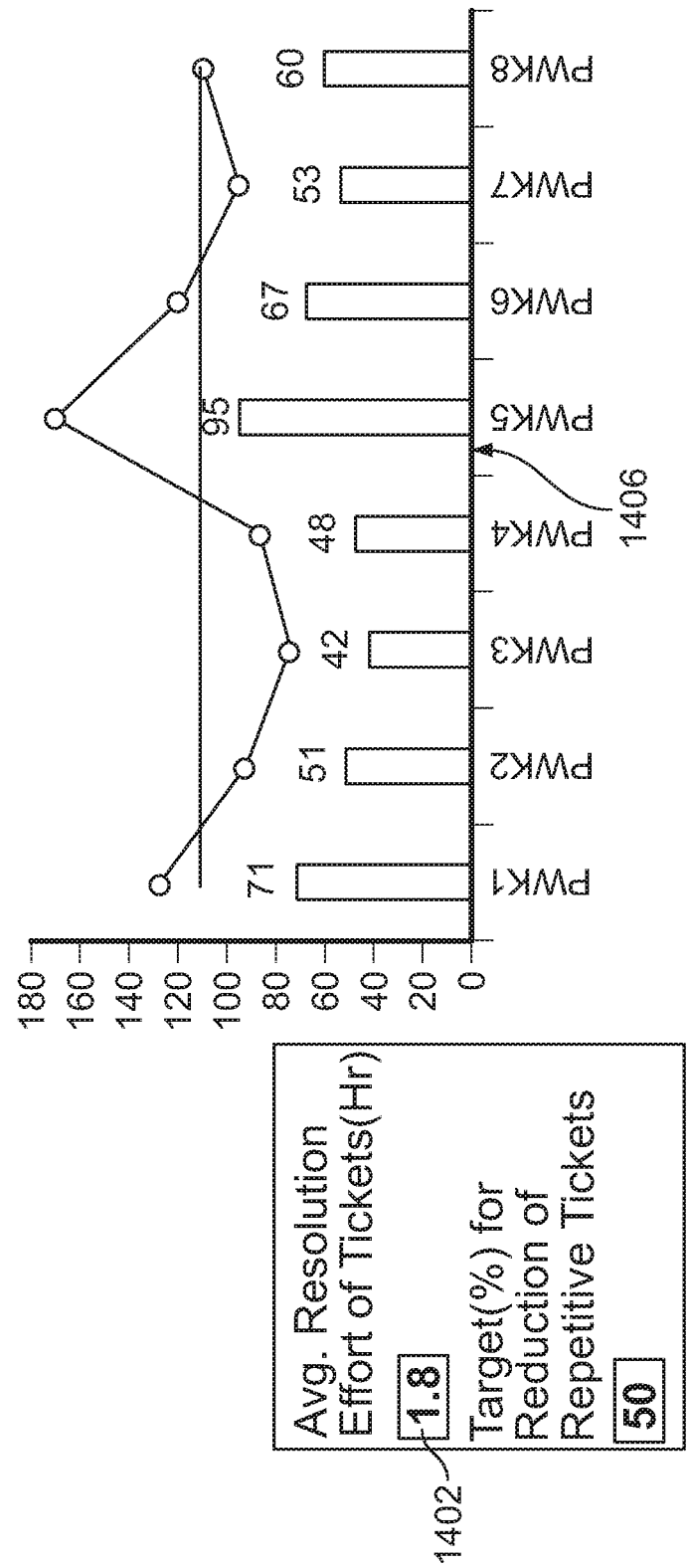
FIG. 14 shows an example of reduced ticket counts and effort savings analysis.

FIG. 14 shows an example of reduced ticket counts and effort savings analysis. Another feature in the predictive analysis may be that if the user enters the average effort to resolve a specific category of repetitive ticket and also enters the percentage of reduction target of the tickets in the upcoming weeks, the prediction may help the user to determine the amount of effort savings per week. As shown in FIG. 14, the average resolution of tickets is 1.8 hours 1402. The target percentage of repetitive tickets reduction is 50% 1404. FIG. 14 also shows the number of predicted ticket number after 50% of target percentage of repetitive tickets reduction is applied to the predicted ticket inflows in FIG. 13. As such, the amount of savings for upcoming weeks may be calculated.

Furthermore, the computer system disclosed in the present disclosure for parsing and aggregating unstructured data objects may read the resolution comments and correlate the resolution comments with repetitive ticket categories. Client tickets may contain resolution comments, which may also be in free text form. As such, the ticket resolution comments may also be unstructured objects analyzed by using the presently disclosed method and system. Thus, after the repetitive tickets are categorized, the presently disclosed system may also read through the corresponding ticket resolution comments and may create solution categories and may correlate the repetitive ticket categories with their corresponding solution categories. These solution categories may be stored in a knowledge management database where the elaborate steps of ticket resolution for these solution categories may be documented.

The new ticket analysis may be conducted by using stored solution categories. For each new ticket, the presently disclosed system may evaluate the new ticket and find if it may map to any of the already existing repetitive ticket categories. If yes, then the system may immediately extract the corresponding solution category and pull out the ticket resolution steps from the knowledge management database with help of the solution category. This practice may ensure significant improvement in productivity as the maintenance project team may make a really lean pyramid to run operations which may provide a significant cost benefit to the maintenance project teams.

The present disclosure would also help to analyze the risk descriptions across the AM, AD and Application Testing projects and categorizing the risks. The key objective of analyzing the risks may be to read through the risk descriptions and categorize the risks into buckets like Customer risk, Team Risk, Staffing risks etc which would enable the users to immediately prioritize the risks as per the categories. The risk categorization at organization level might help understand the most common risks category that majority of the projects faces and would help create a strong risk database with detailed remediation or mitigation steps which can act as a knowledge repository for any new project.

Figure 15:
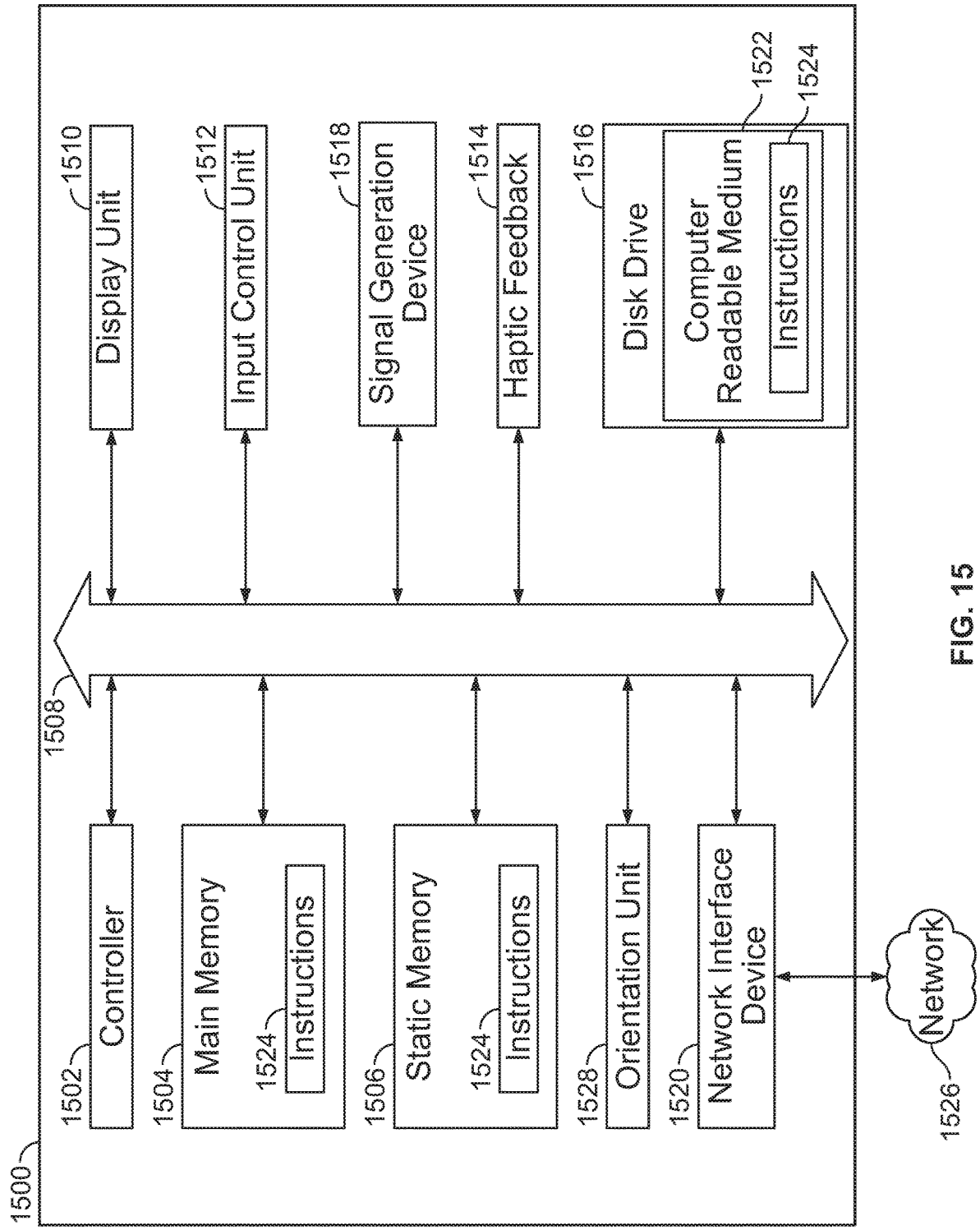
FIG. 15 illustrates an example of a computer system that may be used for parsing and aggregating unstructured data objects.

FIG. 15 illustrates an example of a computer system that may be used for parsing and aggregating unstructured data objects. Referring to FIG. 15, an illustrative embodiment of a computer system that may be used for one or more of the components illustrated by the method and the system in FIGS. 1-2, or in any other system configured to carry out the methods discussed in this disclosure herein, is shown and is designated 1500. Although the computer system 1500 is illustrated in FIG. 15 as including all of the components as illustrated, it is within the scope of this innovation for the computing system to be comprised of fewer, or more, components than just illustrated in FIG. 15.

The computer system 1500 can include a set of instructions 1524 that can be executed to cause the computer system 1500 to perform any one or more of the methods, processes or computer-based functions disclosed herein. For example, a parsing and aggregating unstructured data objects process as described herein may be a program comprised of a set of instructions 1524 that are executed by the controller 1502 to perform any one or more of the methods, processes or computer-based functions described herein. Such a program may be stored in whole, or in any combination of parts, on one or more of the exemplary memory components illustrated in FIG. 15, such as the main memory 1504, static memory 1506, or disk drive 1516.

As described, the computer system 1500 may be mobile device. The computer system 1500 may also be connected using a network 1526 to other computer systems or peripheral devices. In a networked deployment, the computer system 1500 may operate in the capacity of a server or as a client user computer in a server-client user network environment, or as a peer computer system in a peer-to-peer (or distributed) network environment. In addition to embodiments in which the computer system 1500 is implemented, the computer system 1500 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 1500 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 15, the computer system 1500 may include a controller 1502, such as a central processing unit ("CPU"), a graphics processing unit ("GPU"), or both. Moreover, the computer system 1500 can include a main memory 1504, and additionally may include a static memory 1506. In embodiments where more than one memory components are included in the computer system 1500, the memory components can communicate with each other via a bus 1508. As shown, the computer system 1500 may further include a display unit 1510, such as a liquid crystal display ("LCD"), an organic light emitting diode ("OLED"), a flat panel display, a solid state display, or a cathode ray tube ("CRT"). Additionally, the computer system 1500 may include one or more input devices 1512, such as a keyboard, push button(s), scroll wheel, digital camera for image capture and/or visual command recognition, touch screen, touchpad or audio input device (e.g., microphone). The computer system 1500 can also include signal outputting components such as a haptic feedback component 1514 and a signal generation device 1518 that may include a speaker or remote control.

Although not specifically illustrated, the computer system 1500 may additionally include a GPS (Global Positioning System) component for identifying a location of the computer system 1500.

Additionally, the computer system 1500 may include an orientation unit 1528 that includes any combination of one or more gyroscope(s) and accelerometer(s).

The computer system 1500 may also include a network interface device 1520 to allow the computer system 1500 to communicate via wireless, or wired, communication channels with other devices. The network interface device 1520 may be an interface for communicating with another computer system via a Wi-Fi connection, Bluetooth connection, Near Frequency Communication connection, telecommunications connection, internet connection, wired Ethernet connection, or the like. The computer system 1500 may also optionally include a disk drive unit 1516 for accepting a computer readable medium 1522. The computer readable medium 1522 may include a set of instructions that are executable by the controller 1502, and/or the computer readable medium 1522 may be utilized by the computer system 1500 as additional memory storage.

In a particular embodiment, as depicted in FIG. 15, the disk drive unit 1516 may include a computer-readable medium 1522 in which one or more sets of instructions 1524, such as software, can be embedded. Further, the instructions 1524 may embody one or more of the methods, processes, or logic as described herein. In a particular embodiment, the instructions 1524 may reside completely, or at least partially, within the main memory 1504, the static memory 1506, and/or within the controller 1502 during execution by the computer system 1500. The main memory 1504 and the controller 1502 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 1100 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1522 that includes instructions 1524 or receives and executes instructions 1524 responsive to a propagated signal; so that a device connected to a network 1518 can communicate voice, video or data over the network 1518. Further, the instructions 1524 may be transmitted or received over the network 1518 via the network interface device 1520.

While the computer-readable medium 1524 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 1522 can include a solid-state memory such as a memory card or other package that houses one or more non-volatile read-only memories, such as flash memory. Further, the computer-readable medium 1522 can be a random access memory or other volatile re-writable memory. Additionally, the computer-readable medium 1522 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 1522 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by organizations with a need for parsing and aggregating unstructured data objects, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure is primarily targeted to address the application maintenance (AM) services of the IT Industry, but it would not be limited to AM projects only. The present disclosure may be used in a skilled manner to leverage its usage in Application Development (AD) or Application Testing domain for areas like (but not limited to) analyzing defect descriptions, categorizing defects by reading through the defect descriptions etc.

Furthermore, the disclosed method and system may be used for additional comments of different kind of documents such as analysis of survey comments, analysis of quality/process audit comments, and/or analysis of RFP (request for proposal) questionnaires which can help in understanding key expectations of clients. All such analysis falls into the scope of the present disclosure.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A computer-implemented method for providing an interactive user interface based on unstructured data objects, the computer-implemented method comprising:
    obtaining the unstructured data objects from description fields of records in a database comprising client tickets that are created for application maintenance, wherein the unstructured data objects contain elements selected from words, numbers and characters, and obtaining structured data objects from structured fields of the records in the database of the client tickets, wherein the structured data objects include a value corresponding to a priority of the client ticket;
    transforming the obtained unstructured data objects by:
        determining at least one unstructured data object that includes an element matching predetermined words, numbers and characters stored in a word dictionary, and
        removing the matching element from the at least one unstructured data object to form one or more transformed data objects;
    generating criteria attributes for the client tickets, the criteria attributes comprising the priority of the client tickets, text from a corresponding transformed data object, a word importance of a corresponding transformed data object, and a classification of word sentiment of the corresponding transformed data object;
    linking the transformed data objects and the criteria attributes with the client tickets in a database for later query;
    displaying the interactive user interface, the interactive user interface comprising a control for selecting a combination of the generated criteria attributes to interactively control which of the client tickets are counted for repetitive ticket categories;
    receiving, in response to detection of interaction with the control, a selected combination of the generated criteria attributes, the combination including a selected subset of one of more priorities of the client tickets and at least another criteria attribute;
    in response to receipt of the selected combination of the generated criteria attributes:
        aggregating the client tickets into a plurality of groups indicative of repetitive client tickets associated with the selected combination of the generated criteria attributes, wherein the aggregating comprises:
            selecting client tickets linked to the selected combination of the generated criteria attributes,
            identifying matching sets of the transformed data objects linked to the selected client tickets, and
            separating the selected client tickets into the plurality of groups based on the matching sets of the transformed data objects and the selected subset of one of more priorities of the client tickets;
        determining respective numbers of client tickets of each group of the plurality of groups of the selected client tickets; and
        updating the user interface to display a ticket report indicative of the repetitive client ticket categories and the respective numbers of client tickets in each group of the plurality of groups of the selected client tickets according to the priority of the client tickets.

2. The computer-implemented method of claim 1, wherein transforming the obtained unstructured data objects comprises:
    removing punctuation marks and special characters from the obtained unstructured data objects; and
    replacing the removed punctuation marks and special characters with blank spaces.

3. The computer-implemented method of claim 1, wherein the interactive user interface comprises a word cloud that generates a word visualization view by showing most recurring words of the transformed data objects in a largest font.

4. The computer-implemented method of claim 1, wherein the interactive user interface comprises a word distribution by priority by extracting individual words from the transformed data objects and categorizing the individual words according to the priority of the client ticket to create a pie chart.

5. The computer-implemented method of claim 1, wherein the interactive user interface comprises a pareto chart by extracting more than one word from each description field.

6. The computer-implemented method of claim 1, wherein the interactive user interface comprises an individual words pareto chart by extracting individual words from the description fields and categorizing the extracted individual words in the individual words pareto chart according to the priority of the client ticket.

7. The computer-implemented method of claim 6, wherein at least one word of the extracted individual words is marked as an important word when a ratio value for the at least one word of the individual extracted words is more than or equal to a predefined threshold.

8. The computer-implemented method of claim 6, wherein each of the extracted individual words is assigned a sentiment value based on a predetermined dictionary.

9. The computer-implemented method of claim 1, wherein the interactive user interface comprises top recurring words by day of month and month of year that categorize and display the top few recurring words for each day of the month and for each month of the year.

10. The computer-implemented method of claim 1, wherein the interactive user interface comprises word correlation analysis by reading and displaying top 10 words for the priority of the client ticket that are most closely associated with a selected word from a dropdown selection presented in the user interface.

11. The computer-implemented method of claim 1, wherein the interactive user interface comprises categorization of the client tickets for appropriate groups by accepting a list of keywords and resolver group names as a user input, and categorizing the client tickets according to the list of keywords and the resolver group names.

12. The computer-implemented method of claim 1, further comprising:
predicting, for display in the interactive user interface, a future frequency of the tickets for upcoming periods according to the aggregated client tickets, and forecasting maintenance workloads for the upcoming periods according to the predicted future frequency of the tickets.

13. A system for providing an interactive user interface based on unstructured data objects, comprising:
a hardware processor, the hardware processor configured to:
obtain the unstructured data objects from description fields of records in a database comprising client tickets that are created for application maintenance, wherein the unstructured data objects contain elements selected from words, numbers and characters, and obtain structured data objects from structured fields of the records in the database of the client tickets, wherein the structured data objects include a value corresponding to a priority of the client ticket;
transform the obtained unstructured data objects, wherein to transform the unstructured data object, the hardware processor is further configured to:
determine at least one unstructured data object includes an element that matches predetermined words, numbers and characters stored in a word dictionary, and
remove the matching element from the at least one unstructured data object to form a transformed data object;
generate criteria attributes for the client tickets, the criteria attributes comprising the priority of the client tickets, text from a corresponding transformed data object, a word importance of a corresponding transformed data object, and a classification of word sentiment of the corresponding transformed data object;
link, in a database, the transformed data objects and the criteria attributes with the client tickets;
generate the interactive user interface, the interactive user interface comprising a control for selecting a combination of the generated criteria attributes to interactively control which of the client tickets are counted for repetitive ticket categories;

receive, in response to detection of interaction with the control, a selected combination of the generated criteria attributes, the combination including a selected subset of one of more priorities of the client tickets and at least another criteria attribute;
in response to receipt of the selected combination of the generated criteria attributes:
aggregate the client tickets into a plurality of groups indicative of repetitive client tickets associated with the selected combination of the generated criteria attributes, wherein to aggregate the tickets, the hardware processor is further configured to:
select client tickets linked to the selected combination of the generated criteria attributes,
identify matching sets of the transformed data objects associated with the selected client tickets, and
separate the selected client tickets into the plurality of groups based on the matching sets of the transformed data objects and the selected subset of one of more priorities of the client tickets;
determine respective numbers of client tickets of each group of the plurality of groups of the selected client tickets; and
update the user interface to display a ticket report indicative of the repetitive client ticket categories and the respective numbers of client tickets in each group of the plurality of groups of the selected client tickets according to the priority of the client tickets.

14. The system of claim 13, wherein to transform the obtained unstructured data objects, the processor is further configured to:
remove punctuation marks and special characters from the obtained unstructured data objects; and
replace the removed punctuation marks and special characters with blank spaces.

15. The system of claim 13, wherein the interactive user interface comprises a word cloud that generates a word visualization view by showing most recurring words of the transformed data objects in a largest font.

16. The system of claim 13, wherein the interactive user interface comprises a word distribution by priority by extracting individual words from the transformed data objects and categorizing the individual words according to the priority of the client ticket to create a pie chart.

17. The system of claim 13, wherein the interactive user interface comprises a pareto chart by extracting more than one word from each description field.

18. The system of claim 13, wherein the interactive user interface comprises an individual words pareto chart by extracting individual words from the description fields and categorizing the extracted individual words in the individual words pareto chart according to the priority of the client ticket.

19. The system of claim 18, wherein at least one word of the extracted individual words is marked as an important word when a ratio value for the at least one word of the extracted individual words is more than or equal to a predefined threshold.

20. The system of claim 18, wherein each of the extracted individual words is assigned a sentiment value based on a predetermined dictionary.

21. The system of claim 13, wherein the interactive user interface comprises top recurring words by day of month and month of year that categorize and display the top few recurring words for each day of the month and for each month of the year.

22. The system of claim 13, wherein the interactive user interface comprises word correlation analysis by reading and displaying top 10 words for the priority of the client ticket that are most closely associated with a selected word from a dropdown selection presented in the user interface.

23. The system of claim 13, wherein the interactive user interface comprises categorization of the client tickets for appropriate groups by accepting a list of keywords and resolver group names as a user input, and categorizing the client tickets according to the list of keywords and the resolver group names.

24. The system of claim 13, further comprising:
predicting, for display in the interactive user interface, a future frequency of the tickets for upcoming periods according to the aggregated client tickets, and forecasting maintenance workloads for the upcoming periods according to the predicted future frequency of the tickets.

* * * * *